Patented May 9, 1950

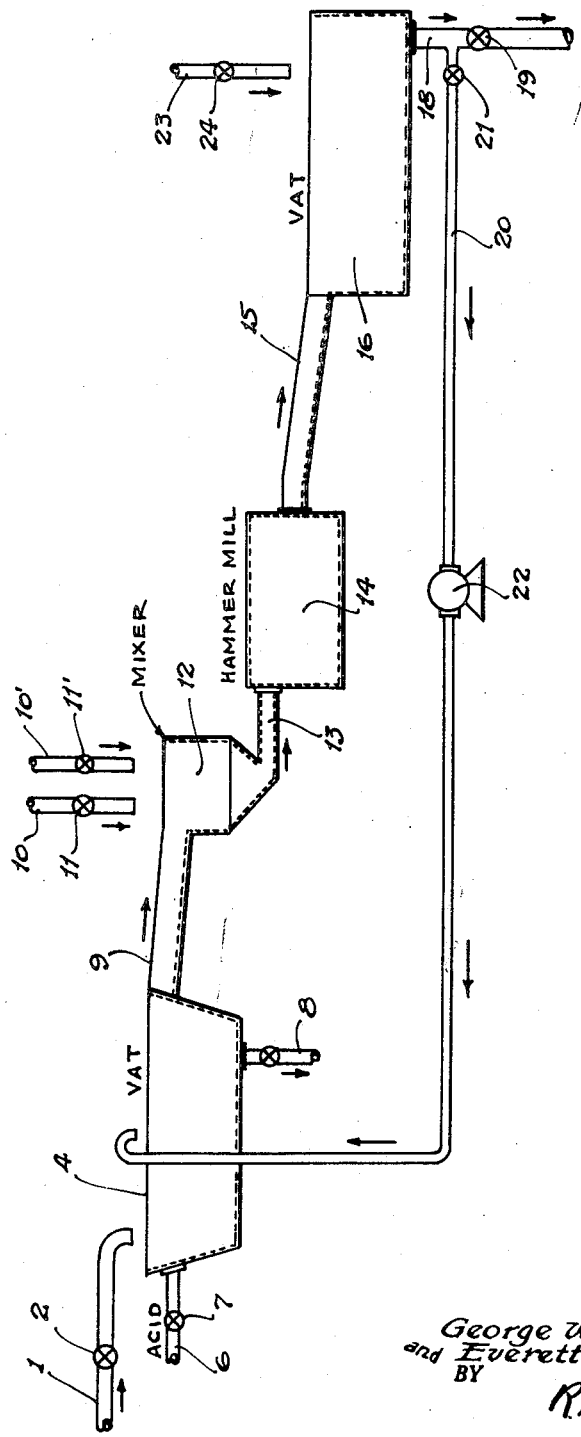

2,507,480

UNITED STATES PATENT OFFICE 2,507,480

MANUFACTURE OF CHEESE

George W. McDonald and Everette C. Scott, Ashton, Ill., assignors, by mesne assignments, to Swift & Company, a corporation of Illinois Application October 19, 1946, Serial No. 704,470

8 Claims. (Cl. 99—116)

This invention relates to a new cheese product and to the process of preparing the same.

Production of cheese involves essentially the coagulation of the casein contained in milk and the expulsion of the whey, or watery portion of the milk. Coagulation of the casein is effected by the addition to the milk of a suitable enzyme, such as rennin, or by treating the milk with lactic acid producing bacteria. Often the aforesaid methods of coagulation are advantageously combined. The curd resulting from the coagulation of milk may be modified by a number of treatments to produce the variety of cheese desired. Modification of the curd is accomplished by a number of different treatments, such as by heating, subjecting the curd to pressure, seasoning, aging and treating the curd with special ripening molds and ferments. Characteristics of the final cheese product, such as taste, moisture content and appearance, are determined by the type of treatment performed on the curd. The water content, in addition, affects the taste of cheese and imparts to cheese it textural qualities, such as body, appearance and smoothness, and therefore its control in the manufacturing process is highly important.

The fundamental constitutent of cheese is casein. Entrapped within the casein are fat and some solids-not-fat substances, such as milk sugar and insignificant small amounts of uncoagulated lactalbumin and lactoglobulin. The whey, on the other hand, is composed principally of water and relatively small amounts of lactose, ash, lactalbumin and riboflavin present in the original milk dissolved therein. These substances do not precipitate with the casein and are present in cheese only to the extent that the whey has been retained by the curd. Since the amount of whey in cheese may be very small, as where the curd is washed with water to produce a washed curd type cheese, these ingredients present in milk are not fully utilized, and the resulting cheese does not contain all of the nutrient constituents of milk, the most important of which is lactalbumin. Lactalbumin is the most perfect protein known because it contains all of the essential amino acids. It is present in milk to the extent of approximately 20 per cent of the casein, the amount of casein in milk being about 2.5 per cent as compared with about 0.5 per cent of lactalbumin. It would therefore be desirable to utilize this valuable protein in cheese making, and thus recover from whey a valuable food product.

An object of the invention is to produce a new cheese product.

Another object of the invention is to produce a cheese having greater nutrient value.

A further object of the invention is to increase the yields in cheese making.

A still further object of the invention is to produce a cheese product having a greater proportion of the proteins found in milk.

Yet another object of the invention is to produce high moisture cheese in large quantities.

A further object of the invention is to provide a more efficient method of preparing high moisture cheeses.

Another object of the invention is to utilize the valuable protein lactalbumin found in whey.

Other objects and advantages of the invention will be apparent from the following description of the invention.

It is contemplated by the present invention to incorporate into cheese the lactalbumin recovered from whey, thus obtaining in cheese form substantially all of the protein matter found in milk. In accordance with the invention, lactalbumin recovered from whey is either added to the milk before coagulating it in the manufacture of cheese, or added to the curd after the curd has been formed. The lactalbumin may be added either before or after coagulation in either the liquid form, as hereinafter more fully to be described, or in the dry form.

Preferably the lactalbumin is added in liquid form to the milk before curdling it in order to effect a more uniform dispersion of the lactalbumin throughout the mass of the curd. It is also preffer to operate in such manner that the whey obtained from a previous cheese-making operation is treated to recover the lactalbumin therefrom and the recovered lactalbumin is then added to a subsequent operation. For example, 100 pounds of milk may be treated to produce about 10 pounds of cheese and 90 pounds of whey. To a second batch of 100 pounds of milk in a subsequent cheese-making operation may be added the lactalbumin recovered from the 90 pounds of whey obtained from the previous operation. Thus, the cheese product obtained from the second operation will contain substantially all of the protein matter present in 100 pounds of milk. As a result of the incorporation of the lactalbumin in the curd, the amount of final cheese product obtained from the second cheese-making operation will be greater than that produced in conventional cheese manufacture. The yield is increased not only to the extent of added lactalbumin, which is present in milk in amounts of about 20 per cent of the casein, but also by the greater moisture absorption made possible by the presence of the lactalbumin; thus, while about 10 pounds of cheese may be manufactured from 100 pounds of milk by following conventional practice, our process produces yields of about 13 pounds of cheese product from 100 pounds of milk. In addition improved textural qualities, such as smoothness and appearance of the product, are obtained. Moreover, our product possesses a more mellow flavor.

In our copending application, Serial No. 636,081, filed December 19, 1945, now Patent No. 2,497,420, February 14, 1950, we have described a process for the recovery of lactalbumin from whey. The process involves treating whey with an alkali, such as soda ash and/or sodium bicarbonate until the titratable acidity of the whey is within the range of 0.07 to 0.12 per cent. Temperature of the whey during neutralization is maintained below the heat coagulable point of the lactalbumin, that is, below 150° F. If fresh whey obtained immediately following the manufacture of cheese is employed, the preliminary neutralization step may be omitted since the acidity of fresh whey is within the prescribed range. Following the determination of the correct acidity, the whey is heated to a temperature between 160° F. and 215° F., after which sufficient acid material, such as hydrochloric acid, is added without agitation in straightline flow to bring the acid range of the heated whey from about 0.07 to 0.12 per cent to a range of about 0.15 to 0.30 per cent. Upon addition of the acid a curd begins to form at the bottom of the vessel, which curd rises to the top in large clumps, where it is collected.

Lactalbumin obtained from the above described process is in gel form, containing 17 to 20 per cent solids. It is also in the form of large clumps, or curds. Therefore, in order to effect its even distribution throughout the milk and a uniform incorporation thereof into the cheese curd, we have found it advantageous to subject the lactalbumin gel to a disintegrating action by passing it through a hammer mill or homogenizer or similar equipment. We have also found in advantageous to reduce the solids content to 9 to 10 per cent prior to treating the gel. Dilution may be accomplished by the addition of water or by the addition of whole milk to the gel until the solids content is about 9 to 10 per cent. The reduction of the solids facilitates the disruption of the gel and makes possible a homogenized product in the form of a viscous liquid. This liquid then added to milk prior to curdling may be readily dispersed therethrough and the lactalbumin contained therein uniformly incorporated into the curd.

The process herein disclosed is particularly adapted to the manufacture of American type cheeses, such as Cheddar, washed curd and Colby.

In the manufacture of American type cheeses, whole milk is usually employed. A sweet curd is obtained by treating the milk with lactic acid-producing starter and rennet. The curd is then cut into small pieces by means of a suitable cutter, such as a wire curd knife. Usually the curd is cut into small regular cubes so that an even expulsion of the whey from the curd may be effected. After the curd is cut, the pieces are constantly agitated and heat is carefully applied thereto. The heating causes further expulsion of the whey and imparts firmness to the curd particles. When the curd possesses the proper firmness, heating is discontinued and the stirring continued until the proper acidity in the whey has developed, after which the whey is withdrawn and the curd salted and put into hoops of desired shape, pressed and aged.

In the case of Cheddar cheese, the curd is matted or piled. Matting or piling of the curd is known as "cheddaring" and by means of the cheddaring process additional moisture is expelled from the curd. The moisture content of green Cheddar cheese is around 35 per cent.

In the American type cheeses, such as Colby and washed curd, it is desirable to have the moisture content around 40 per cent, which is accomplished by following in general the procedure outlined above. In the higher moisture cheeses, however, a greater amount of water is retained in the curd by varying the heating, or cooking step; that is, the moisture content of the curd may be increased by employing a "faster cook" achieved by raising the temperature to the desired point over a short period of time. As a consequence of the rapid increase in temperature, the acidity of the whey is not so high as in the making of Cheddar cheese. An additional factor making for greater moisture content is the omission of the Cheddar process from the production of high moisture cheeses. In accordance with our process it is not necessary to vary the procedure from conventional Cheddar cheese manufacture in order to obtain greater moisture retention by the curd.

In making other types of cheese having still higher moisture content of 45 to 50 per cent, such as "Liederkranz," "Chantelle," etc., small quantities of milk are treated separately so that the curds may be placed into the desired forms in a short time. The use of small amounts of material shortens the handling time of a given batch and permits all operations to be completed without any curd waiting unduly for forming. The curd is then placed in the desired forms soon after draining of the whey from the curd. Moreover, in order to expedite the treatment on the curd, special kettles of relatively small volume are employed in the manufacture of cheese having a high water content, whereas in the preparation of the American type of cheese vats of large volumes are advantageously employed. Incorporation of the lactalbumin in the soft curd cheeses improves the manufacturing process thereof. Large quantities of material may be handled over a long period of time because of the water retention properties of the added lactalbumin.

The accompanying drawing illustrates diagrammatically a preferred embodiment of the invention.

In the drawing, numeral 1 represents a line, provided with valve 2, through which whey may be introduced into vat 4. The vat 4 may be any suitable jacketed vessel having an inlet 6, provided with valve 7, through which may be introduced the acid material used in the precipitation of the lactalbumin from the whey.

Upon coagulation, the lactalbumin rises to the top of the vat and may be withdrawn therefrom through line, or trough, 9 and introduced into the hopper, or mixer, 12. The whey material remaining after removal of the lactalbumin may be withdrawn through line 8. By means of inlet 10, provided with valve 11, a suitable diluent, such as water or milk, may be introduced into mixer 12, which is provided with suitable mixing means to agitate the materials contained therein. The resulting mixture of diluent and protein is then conveyed by means of line 13 into hammer mill 14, wherein the lactalbumin is broken up and a slurry thereof is formed. The slurry is then conveyed through line, or trough, 15 to cheese vat 16, wherein the milk is curdled to make cheese. Whey resulting from the cheese-making operation in vat 16 may be discharged through line 18. Any portion or all of the whey may be recycled through line 20 to vat 4 by means of pump 22 and suitable control of valves 19 and 21. The whey discharged through line 19 may be separately treated to recover the lactalbumin which may be added to vat 16 or used in a subsequent cheese-making operation not shown.

Lactalbumin recovered from the process or from an extraneous source may be introduced into mixer 12 by line 10', provided with valve 11'. If the lactalbumin introduced through line 10' is in dry form, the required amount of diluent, such as water or milk, may be charged through line 10 to produce the desired solids content in the slurry formed as a result of the mixture passing through hammer mill 14. In some cases it may be advantageous to add lactalbumin in dry or wet form to cheese vat 16 by means of line 23, provided with valve 24.

As an example illustrating the invention, approximately 9,200 pounds of whole milk having a fat concentration of 3.25 per cent were placed in a 10,000 pound jacketed cheese vat. To this milk 2 per cent of lactic acid starter was added and then a lactalbumin slurry of about 10 per cent solids content. The lactalbumin had been recovered from a former cheese operation wherein approximately the same amount of milk had been used. Rennet extract in the ratio of 3 fluid ounces to 1,000 pounds of fluid in the vat was then added. Curdling of the milk was complete in about 30 minutes. The curd was cut by means of a wire curd knife into small ⅜ inch cubes. Heat was then slowly applied through the jacket of the vat and the temperature of the contents raised to 102° F. in 30 minutes time. The curd pieces were constantly agitated by hand during this period, after which heating was discontinued and agitation of the curd continued until the acidity in the whey was 0.162 per cent lactic acid. The whey was drained from the curd and placed in a tank preparatory to the recovery of lactalbumin therefrom to be used in a subsequent operation. The granular curd was salted, placed into hoops, and pressed. After pressing, the moisture content of the green cheese product was approximately 52 per cent. On aging for 4 weeks the moisture content of the cheese product was about 47 per cent.

If it is desired to produce a cheese product of slightly lower moisture content, the curd may be cheddared prior to pressing.

As a further example, the following operation illustrates the application of the invention in the preparation of a cheese of the Edam type. Approximately 45 pounds of lactalbumin obtained from about 8,300 pounds of whey resulting from the cheese-making operation described in the aforementioned example were sent through a hammer mill together with approximately 450 pounds of whole milk, so that the solids content of the resulting slurry was about 10 per cent. This lactalbumin slurry was added to 9,200 pounds of pasteurized whole milk having a fat content of 3.8 per cent in a 10,000 pound vat. About 0.5 per cent of a commercial lactic acid starter was added and the milk heated to 88° F. until the acidity thereof was 0.1 per cent lactic acid. About 9¼ ounces of cheese color were added to the milk and then about 27½ ounces of rennet extract were added. After about 20 minutes the resulting curd was cut in ¼ inch cubes by means of wire curd knives and thereafter the cubes were further subdivided by means of the vertical curd knife into curd pieces the size of wheat grains. Stirring of the curd was then continued for 20 minutes at a temperature of about 88° F., after which about one third of the whey was removed from the vat. Sufficient hot water at 145° F. was added to the vat slowly until the temperature therein was about 102° F., which temperature was held for 25 minutes. By means of a curd fork, the curd was pushed against the end of the vat to form a large block of curd. After draining of the whey, the curd block was split into smaller blocks of curd. The blocks were placed into Edam cheese molds, and the molds turned until the curd assumed the shape of the mold, which required about 2 hours. The curd was then removed, trimmed, and wrapped with a muslin cloth. The wrapped curd was again put into molds and allowed to remain in an upright cheese press overnight. The following morning, the curd was demoved from the molds, the muslin cloths taken off, and the formed curds placed into a saturated brine solution for 48 hours. After aging for 3 months in a curing room at 55° F. the cheese was coated with a red flexible cheese wax and wrapped in red Cellophane. The moisture of the final cheese was 48 per cent, and the fat content 21.2 per cent.

In case it is not desired to use the lactalbumin soon after it is recovered from whey, the lactalbumin may be refrigerated at temperatures below 50° F. until ready for use.

In order to produce a cheese product having a greater fat content calculated on a dry basis, it is often advantageous to adjust upwardly the fat content of the milk, as by enriching the original milk with cream to the extent of increasing the ratio of fat to protein on the dry basis by an amount equivalent to the added protein, that is, about 20 per cent. In the soft curd cheeses, where the fat content is somewhat lower than in the American type cheeses, usually the milk used need not be treated to increase its fat content.

Although our invention is particularly suitable to the preparation of American type cheeses, other type cheeses may be advantageously treated. In general, the process is applicable to the preparation of cheeses wherein a high moisture content is desired and which are consequently soft-bodied. Examples of such cheeses are the Dutch types, such as Edam and Gouda, Swiss, Chantelle, Liederkranz, Limburger, Camembert, etc. Because of the water holding properties due to the incorporated lactalbumin the moisture content may be maintained in the curd and no special handling technique, such as manipulating small amounts of material, is required to prevent its loss. Preferably, the lactalbumin is added in the form of a slurry or viscous liquid, as hereinabove described, to the milk prior to curdling it. After the coagulation step, the curd is treated according to the procedure peculiar to the type of cheese desired.

We have found it convenient to add the lactalbumin in quantities equivalent to the amount of lactalbumin present in the milk to be treated. This practice makes possible an effective and practical method of operation, which involves recovering the lactalbumin from whey obtained from a previous cheese operation and adding this lactalbumin to a subsequent operation, the whey from which is also treated to remove the lactalbumin therefrom for use in a following operation.

We have found that the texture of the cheese may be advantageously modified by incorporating into the curd amounts of coagulated lactalbumin ranging from as little as about 1 per cent to as much as about 50 per cent of the casein present. However, a range from about 10 to about 30 per cent is preferred. The proportion of coagulated lactalbumin may be varied over a wide range, depending on the degree of moisture desired in the final cheese product.

Obviously, many modifications and variations of the invention, as hereinbefore set forth, may be made without departing from the spirit and scope thereof, and therefore only such limitations should be imposed as are indicated in the appended claims.

We claim:

1. The process of coagulating a milk product for use in preparing a cheese product having greater moisture-holding properties and enhanced nutritive value which comprises coagulating lactalbumin from whey separated from a previously treated quantity of milk in the form of large clumps, homogenizing the precipitated lactalbumin, adding the homogenized and coagulated lactalbumin to said milk product in amounts ranging from about 1 per cent to 50 per cent of the casein present in the milk, and then curdling the milk with a chemical curdling agent, whereby the lactalbumin is uniformly dispersed throughout the curd and incorporated therein.

2. The process substantially as described in claim 1 wherein the added coagulated lactalbumin ranges from 10 per cent to 30 per cent on the casein.

3. The process of coagulating a milk product for use in preparing a cheese product having greater moisture-holding properties and enhanced nutritive value which comprises coagulating lactalbumin from whey separated from a previously treated quantity of milk in the form of large clumps, homogenizing the precipitated lactalbumin, treating milk with a chemical curdling agent to coagulate the casein contained therein and intimately mixing the curd with said homogenized and coagulated lactalbumin in amounts ranging from about 1 per cent to about 50 percent of the coagulated casein.

4. The process of manufacturing cheese in greater yields, said cheese having improved textural and nutritive qualities which comprises heat coagulating lactalbumin in the form of a clumpy gel from whey separated from a previously treated quantity of milk, homogenizing the gel, diluting the gel to form a slurry, adding to milk prior to the coagulation thereof an amount of said lactalbumin gel slurry equivalent to that present in said milk, then coagulating the milk in the substantial absence of heat by adding a chemical curdling agent thereto whereby said lactalbumin is incorporated into the curd, and then treating the resulting curd in a manner to produce cheese.

5. The process substantially as described in claim 4 wherein the lactalbumin slurry has a solids content of about 10 per cent.

6. The process of making cheese to improve the yields and nutritive value thereof which comprises coagulating a milk product with a chemical curdling agent to produce curds and whey, separating the curds from the whey, treating the whey to recover the lactalbumin therefrom in the form of clumpy curds, homogenizing the recovered lactalbumin, forming a slurry of said lactalbumin, adding said slurry to the curds of a so-treated milk product, and then producing cheese from the curds.

7. The process of preparing cheese in improved yields and possessing improved nutritive value which comprises treating the whey from a previous creese-making operation wherein the milk was coagulated with a chemical curdling agent whereby to recover the lactalbumin therefrom in the form of clumpy curds, homogenizing the recovered lactalbumin, adding a slurry of said lactalbumin to a batch of milk similar in amount to that used in the previous operation, coagulating said milk with a chemical curdling agent, and treating the resulting curd to produce cheese.

8. The improvement in making cheese comprising coagulating lactalbumin in the form of clumps from the whey resulting from the processing of milk to produce cheese, homogenizing the precipitated lactalbumin, mixing said homogenized lactalbumin with milk from which cheese is to be made, providing a curd which may be treated to produce cheese, the curd taking the form of an intimate mixture of said previously homogenized and coagulated lactalbumin and the curd being formed by coagulating said milk with a chemical curdling agent and at a temperature below that at which the natural casein in the milk would otherwise be precipitated by the heat, and treating the mixture in a manner to produce cheese.

GEORGE W. McDONALD.
EVERETTE C. SCOTT.

REFERENCES CITED

The following references are of record in the file of this patent:

UNITED STATES PATENTS

| Number | Name | Date |
|---|---|---|
| 319,882 | Burrell | June 9, 1885 |
| 482,897 | Frederiksen | Sept. 20, 1892 |
| 709,003 | Dunham | Sept. 16, 1902 |
| 1,491,166 | Peebles | Apr. 22, 1924 |
| 1,634,410 | Eldredge | July 5, 1927 |
| 2,009,136 | Grelck | July 23, 1935 |